(12) United States Patent
Lysa

(10) Patent No.: US 7,905,051 B2
(45) Date of Patent: Mar. 15, 2011

(54) SUSPENDED COVER

(75) Inventor: Per Age Lysa, Oslo (NO)

(73) Assignee: Intravision AS, Oslo (NO)

( * ) Notice: Subject to any disclaimer, the term of this patent is extended or adjusted under 35 U.S.C. 154(b) by 377 days.

(21) Appl. No.: 11/663,237

(22) PCT Filed: Sep. 16, 2005

(86) PCT No.: PCT/NO2005/000342
§ 371 (c)(1),
(2), (4) Date: Sep. 26, 2007

(87) PCT Pub. No.: WO2006/054899
PCT Pub. Date: May 26, 2006

(65) Prior Publication Data
US 2008/0060262 A1    Mar. 13, 2008

(30) Foreign Application Priority Data

Sep. 17, 2004 (NO) .................................... 20043896

(51) Int. Cl.
*A01G 25/00* (2006.01)
(52) U.S. Cl. ............................ 47/21.1; 47/29.5; 47/29.6
(58) Field of Classification Search .................. 47/20.1, 47/21.1, 32.1, 29.3, 29.1, 29.5, 29.6, 29.7, 47/30, 17, 22.1; 362/122; 472/92
See application file for complete search history.

(56) References Cited

U.S. PATENT DOCUMENTS

| | | | | |
|---|---|---|---|---|
| 4,907,793 A | * | 3/1990 | Wund | 472/92 |
| 5,241,782 A | * | 9/1993 | McCarthy et al. | 47/29.1 |
| 5,265,373 A | * | 11/1993 | Vollebregt | 47/17 |
| 2004/0134122 A1 | * | 7/2004 | Van Bergen-Henegouwen et al. | 47/22.1 |

FOREIGN PATENT DOCUMENTS

| | | |
|---|---|---|
| GB | 2309172 A | 7/1997 |
| WO | 8805678 A1 | 8/1988 |
| WO | 0057689 A1 | 10/2000 |
| WO | 0107126 A1 | 2/2001 |

* cited by examiner

*Primary Examiner* — T. Nguyen
(74) *Attorney, Agent, or Firm* — Ladas & Parry LLP

(57) ABSTRACT

The present invention relates to a system for promoting the growth of plants under less than optimal climatic and lighting conditions, the system comprising a device which contributes to the formation of an enclosed space over the plants, and at least one source of light. A special characteristic of the invention is that the device which contributes to the formation of an enclosed space over the plants consists of a flexible tarp (1) which comprises integrated lighting sources (6), the flexible tarp (1) being kept up at an optional height over the plants by means of excess pressure built up under the tarp (1) by means of an excess pressure system (5).

11 Claims, 6 Drawing Sheets

SUSPENDED COVER

The present invention relates to a system for promoting growth of plants under less than optimal climate and lighting conditions, the system comprising a device that forms an enclosed space above the plants, as well as at least one light source.

It is known that poor lighting and stagnant air result in poor grass fields. In addition, the grass on for example football fields and tennis courts is exposed to severe wear and tear. This usually results in restrictions on the use of field or court, or use of expensive and time consuming operations for maintaining and/or replacing the grass. These problems are compounded in northern latitudes, where the supply of light is limited either because of the season, or because stadiums and stadium roofs block the sun. In addition, stadiums and stadium roofs add to the amount of stagnant air, further worsening growing conditions.

In Amsterdam, the Netherlands, the football club Ajax replaces the grass field of their football stadium twice a year. In Sapporo, Japan, they have constructed a system whereby the entire grass field is placed in a "drawer" that can be pushed in and out of the enclosed stadium. In Trondheim, Norway, the football club Rosenborg has to limit the use of their Lerkendal Stadium to a bare minimum in order to prevent the field from wearing out.

Various systems for improving lighting, as well as providing fresh air and carbon dioxide in order to improve the growth of grass fields, have previously been proposed. NO B1 308981 relates to a movable lighting unit for use on grass fields wherein a box-like enclosure equipped with built-in lights may be moved-from one location of the field to another. For practical reasons the box-like enclosure may not be too large, and this limits both the light treatment time and the light treatment area considerably. EP 561193 relates to a device for artificial lighting and supply of carbon dioxide and fresh air, utilizing an enclosure arranged over for example the field of a football stadium. US2004/0109302 A1 relates to a growth promoting system producing pulses of red and white light from diodes.

It is the aim of the present invention to provide a system that facilitates the improvement of grass quality on sports fields or decorative lawns.

A second aim of the present invention is to provide a system that in a practical way provides a higher degree of utilization and greater frequency of use of grass sports fields that are exposed to wear and tear.

A third aim of the present invention is to provide a system that prolongs the out-door season of sports fields.

A fourth aim of the present invention is to provide a system that facilitates the use of natural grass as a playing surface in indoor sport centres, or in the event facilitates the laying of indoor grass lawns.

According to the present invention these and other aims are achieved by means of a system of the present kind, characterized in the features mentioned in the characterizing clause of claim 1. Further advantageous features and embodiments are given in the dependent claims.

A detailed description of the present invention is given below with reference to the attached drawings, wherein:

FIG. 1a shows a perspective view of an embodiment of the present invention,

FIG. 1b shows a side view of the same as in FIG. 1a,

Figure 2:
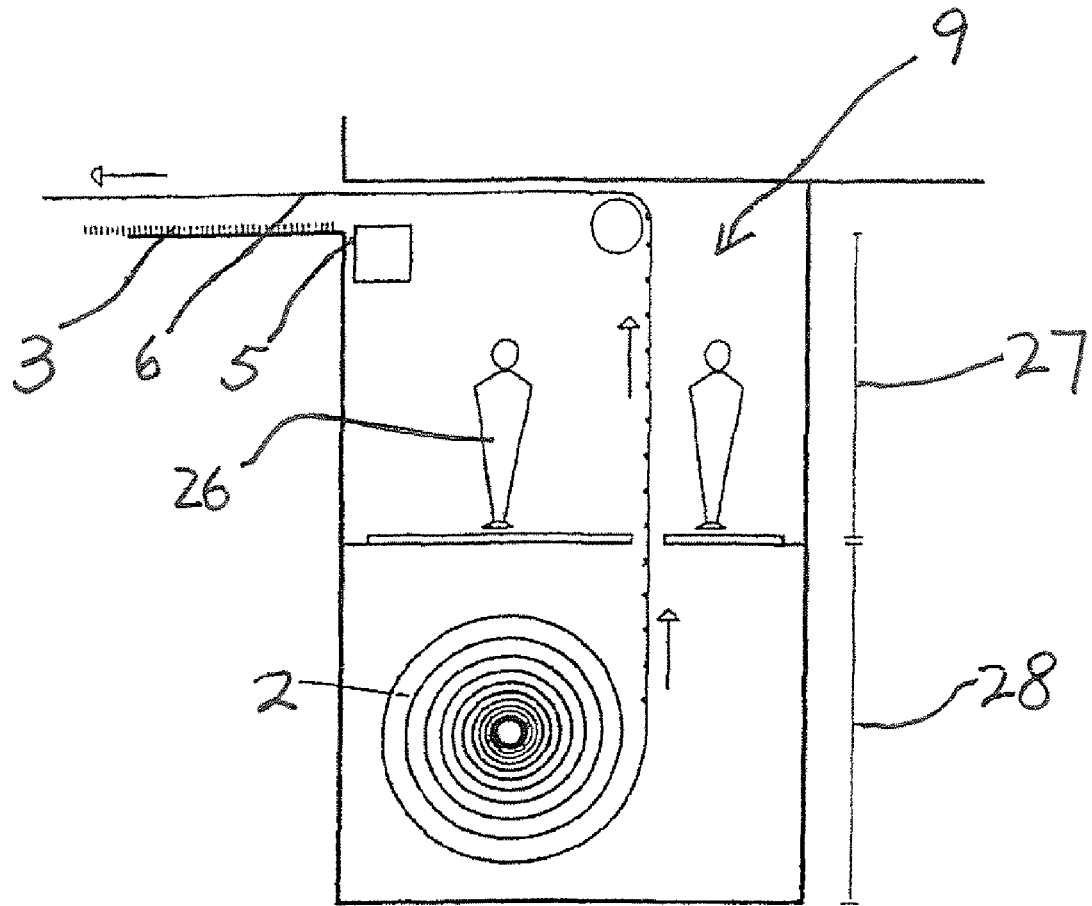
Figure 3:
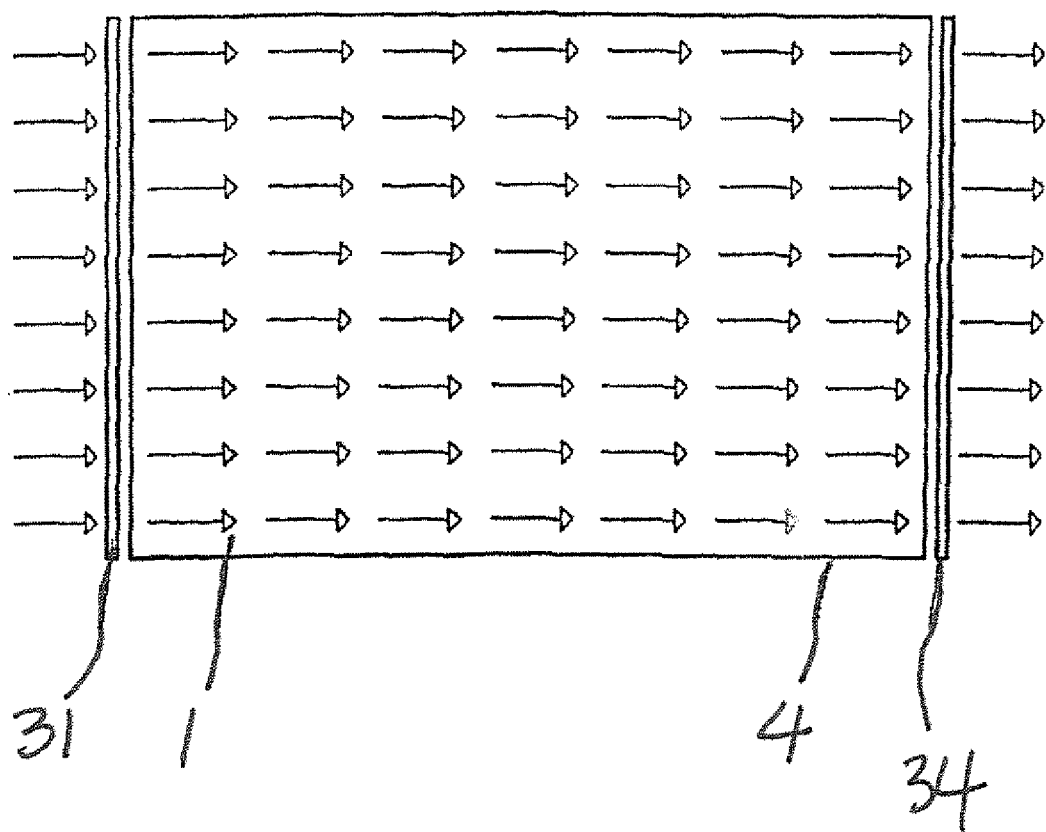
Figure 4:
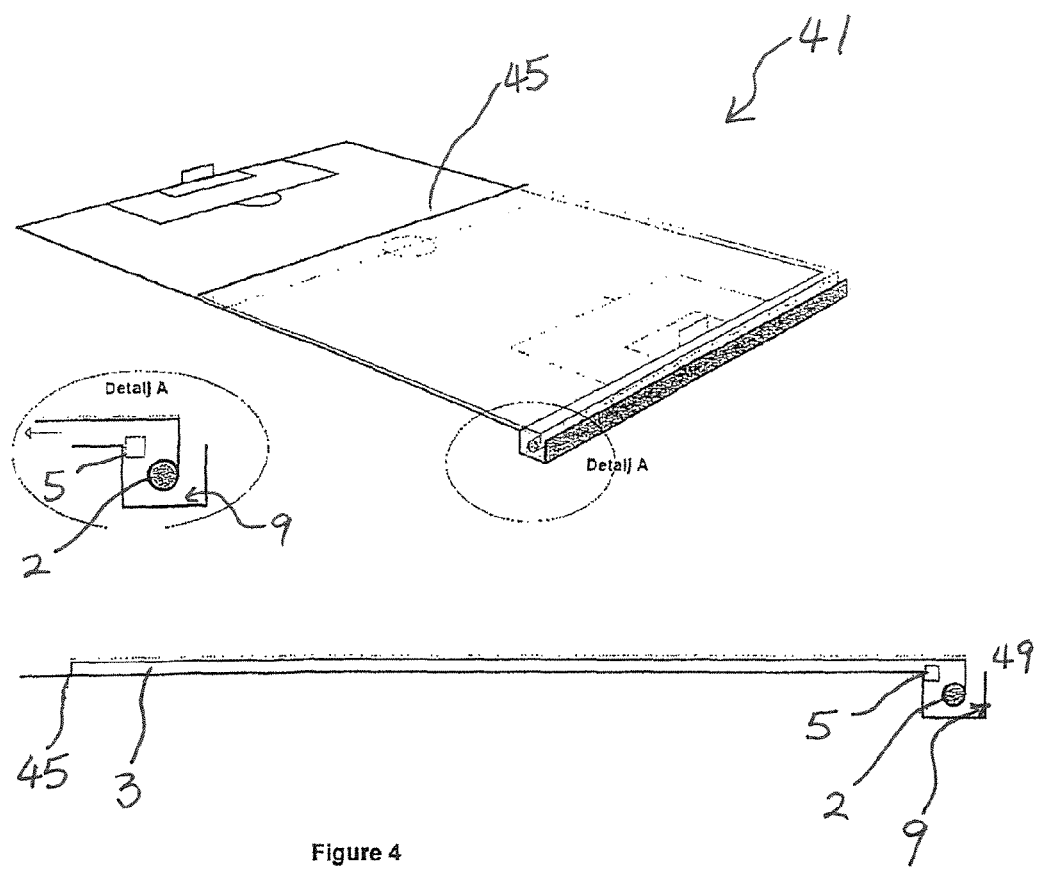
Figure 5:
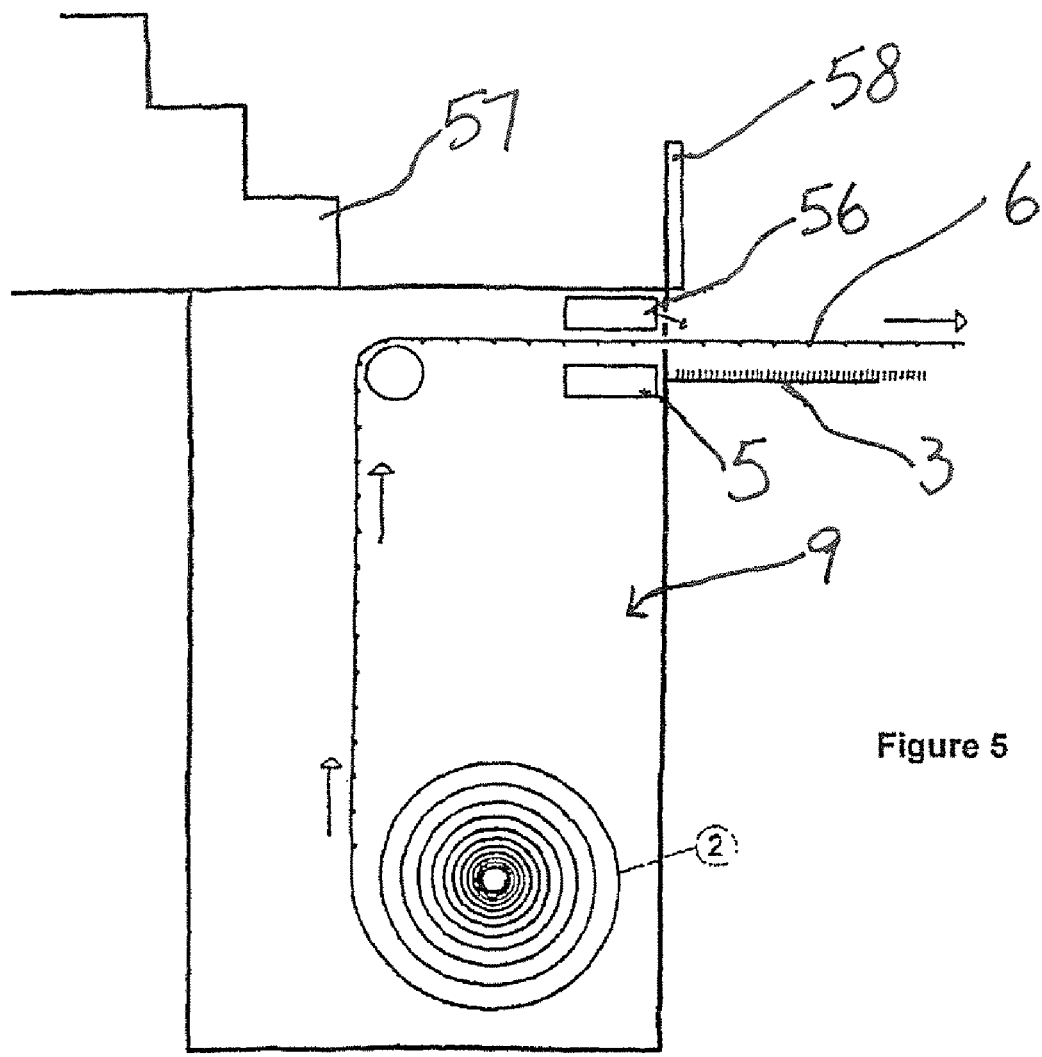

FIG. 2 shows an alternative, space-saving manner of storing a light tarp according to the present invention, wherein the light tarp may be wound into or out of a culvert, FIG. 3 shows a light tarp according to the present invention seen from above, the arrows suggesting how air, carbon dioxide and/or nutrients may be led through the system, FIG. 4 shows a sports field in perspective, with being placed a culvert along one of the ends, and FIG. 5 shows an alternative embodiment of a culvert for storing a light tarp according to the present invention.

The system according to the present invention comprises a tarp 1 comprising light sources 6 that may be rolled out and kept floating by means of an air pressure, and can be wound into a reel 2 when it is not in use.

The tarp may be rolled/drawn out over an area 3 by means of a rail/wire/roller system 4 along the sides. When the tarp 1 is rolled out, all sides and ends are closed in order to sustain the air pressure under the tarp 1 with the least possible amount of air and use of energy for air fans 5.

According to the present invention, the tarp 1 is provided with a number of light sources 6. These light sources 6 are arranged in some pattern or other on the tarp 1 in order to optimize the light conditions at a given distance under the tarp 1. The size and shape of the tarp 1, as well as the spectral composition, intensity and lighting period of the lights 6, may be adapted to the specific physiology of the plants that are to be illuminated and the arena.

The light source 6 may be fluorescent light, light-emitting diodes (LEDs), or other alternative light sources. According to the present invention, LEDs are preferred, as these are small, light in weight, and bright, in addition to being easily adaptable in regard to the spectral composition. It is understood that all kinds of light sources that have comparable (or better) properties, may be used as well. Because of these properties, the LEDs may easily be arranged on a flexible and robust tarp 1. The light may have a wide bandwidth, i.e. include wavelengths from large parts of the electromagnetic spectrum, or a narrow bandwidth, i.e. include only one or a few specific wavelengths in order to promote specific physiological properties of the plants. The lighting system is integrated in the tarp 1, and the system is designed for outdoor and indoor use. According to one embodiment of the present invention, the light sources 6 emit narrow bandwidth light comprising a spectral composition of 60-99% red light (600-630 nm) in combination with 1-20% blue light (400-450 nm) and/or 1-20% white light.

The tarp 1 comprising the light sources 6 can be rolled out over the area about to undergo treatment, and is kept floating above the plants (1-1000 mm) by pressurizing the volume under the tarp. A space is thereby formed beneath the tarp 1 that helps to control the distance between the tarp 1, and thus the light sources 6, and the plants under the tarp 1, in addition to making it possible to control the climate under the tarp 1 in regard to temperature, humidity, composition etc. The air pressure may for instance be built up by means of suitable fans or the like. The air pressure [Pa] required depends on the weight [Kg/m2] to be held up. A typical preferred pressure may be from 5-10 Pa to 100,000 Pa. The air under the tarp 1 may be circulated, heated or cooled, and carbon dioxide may be added in order to provide optimal conditions for plant growth. The air flow under the tarp 1 may be controlled by opening or closing ventilation apertures. These apertures may be arranged in the tarp or in the ground under the tarp. The purpose of the air flow (ventilation) is to control the atmospheric climate between the plants and the tarp 1: temperature control, removing excess heat over and under the tarp 1, as well as removing water vapour and other unwanted gases. The air under the tarp 1 may also be provided with carbon dioxide through the ventilation generator in order to further improve the conditions for plant growth. Furthermore, the pressure under the tarp 1 may the controlled according to need in the case of precipitation in the form of snow or rain on top of the tarp 1, thereby continuously ensuring the optimal distance between the tarp 1 and the plants 3. For example, if rain results in a lowering of the temperature beneath the tarp 1, the temperature may be raised.

The tarp 1 may be translucent in order to let natural light pass through, this being energy efficient in regard to both light and temperature. Thereby, the tarp 1 in effect constitutes a greenhouse.

The light that plants are able to utilize in photosynthesis is called photosynthetic active radiation or PAR. PAR lies within the area 400-700 nm. When growing plants in a controlled climate both the light quality and quantity are very important factors. In photosynthesis, the total amount of light is of great importance. The growth conditions in arenas with tall stands, grounds in northern latitudes, or new indoor arenas are often very poor. Short days (in the north) and/or stands or buildings that block incoming light reduces the total amount of light, and in addition, stands and buildings block the wind and result in stagnant air above the turf. Both these factors hinder growth and degrade growing conditions.

The present growth and maintenance system differs from similar, previously patented systems in that it comprises a flexible tarp 1 with integrated lights 6, and in that the tarp 1 is kept afloat by means of air pressure. In a rolled up state the tarp 1 requires little storage space and it is quick and easy to use. The prior art has a number of limitations in regard to their use in e.g. football fields: the systems require a lot of space (large structures or mobile units), they are time consuming to deploy, or they lack a number of features that are important for producing optimal growth conditions (e.g. ventilation or adding carbon dioxide). The purpose of the ventilation is to control the atmospheric climate between the plants and the tarp 1: temperature control, removing excess heat under and over the tarp 1, and removing excess moisture, oxygen and other unwanted gases. The air beneath the tarp 1 may also be supplied with carbon dioxide via the fans in order to improve growth conditions further.

The flexible tarp 1 comprising lights 6 kept floating by means of air pressure according to the present invention, stands out in that is makes it simpler in practice to obtain considerably better growth conditions. The tarp 1 can be quickly and easily rolled on and off the field, the lights are integrated in the tarp 1 and come close to the plants (allowing for excellent efficiency and utilization), the lights 6 may emit narrow bandwidth light in order to establish the optimal light composition, no supporting structures are required as the tarp 1 is kept floating by means of an air pressure (air cushion), and it is possible to control the air flow under the tarp 1 by means of various ventilation inflow and outflow apertures, thereby optimizing the air composition (carbon dioxide, oxygen, moisture and temperature) and preventing stagnant air above the plants.

Furthermore, the tarp 1 may cover the entire field and provide effective protection against unwanted precipitation. In addition, a translucent tarp 1 is an advantage in that it can utilize natural light in addition to the artificial light.

The tarp 1 may comprise more than one layer, wherein a separate layer may conduct electricity or contain necessary cables and electronics. The tarp 1 may be reinforced by means of fibres, threads or ribs. These may comprise carbon fibres, fibreglass or other fibres that are strong, light and flexible. According to one embodiment it is possible to stiffen the tarp 1 by means of air beams that are sewn into or otherwise arranged in the tarp 1.

Along the sides of the tarp 1 in the winding direction, a rail or wire system 7 may be arranged in order to pull out and guide the tarp 1. Winding the tarp 1 onto a drum may be accomplished by means of a suitable mechanical drive. Once the tarp 1 has been pulled out, it may be sealed along the sides and ends. The rail or wire system 7 may in itself provide the sealing.

The tarp 1 may be wound onto a drum 8 that is suitably positioned on one of the sides of the field, and may be stored in a culvert 9. The system may also be arranged on a cart, thereby making the system mobile.

The dimensions of the drum/cart 2 and the length and breath of the tarp 1 may be adapted to the specific area 3 to be illuminated. According to one embodiment of the system, the tarp 1 may when being wound in and out, be open at the front end, and partly open along the sides. The ventilation system 5 may then blow a sufficient amount of air in under the tarp 1 to keep it floating, facilitating the removal or deployment of the tarp 1, as well as drying the tarp and protecting the grass from damage.

An over pressure system 5 comprising suitable ventilation apertures in or under the tarp 1 will provide sufficient air pressure to keep the tarp floating and possibly also carry further loads. The over pressure system 5 may also comprise a fertiliser and/or irrigation system, or else the fertiliser and/or irrigation system may be integrated in the tarp 1. It is understood that the over pressure system 5 may comprise one or more fans or corresponding means.

In addition to improving the grass quality or enabling the growth of grass on a sports field, the present invention may also be used to enhance the growth conditions for other plants than grass. The present invention may for be used by farmers/market gardeners to improve lighting conditions and thereby the yield during periods with little light, e.g. the winter season. The light tarp 1 according the present invention may also be used to replace light fittings as used in the greenhouse industry today. The area over which the light tarp 1 floats does not have to be completely level, and may be used to cover a golf green, an undulating pasture or the like. One advantage of the flexible, floating light tarp 1 according to the present invention is that it may be adapted to various ground surfaces.

The growth promoting system according to the present invention may be controlled by means of a control system that uses a number of parameters, such as temperature over/under the tarp, humidity, distance above the ground, the load on the tarp (wind, snow, rain etc.), may adjust the air pressure under the tarp in order to fulfill the desired requirements. If the light tarp 1 is to be used outdoors, the control system may comprise means to quickly wind in the tarp if weather conditions are severe enough to damage it. Furthermore, the control system may comprise a monitoring system that automatically controls lighting intensity, lighting periods, watering amounts etc.

Figure 1:
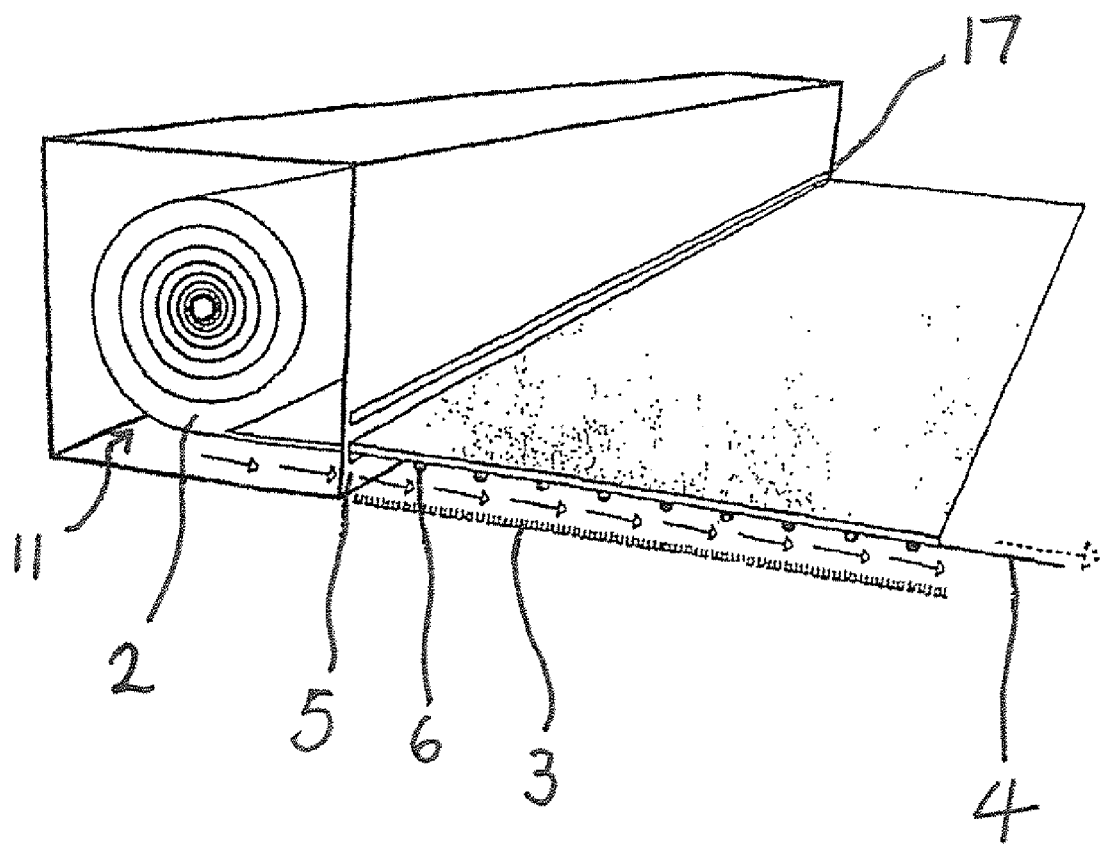
Figure 1:
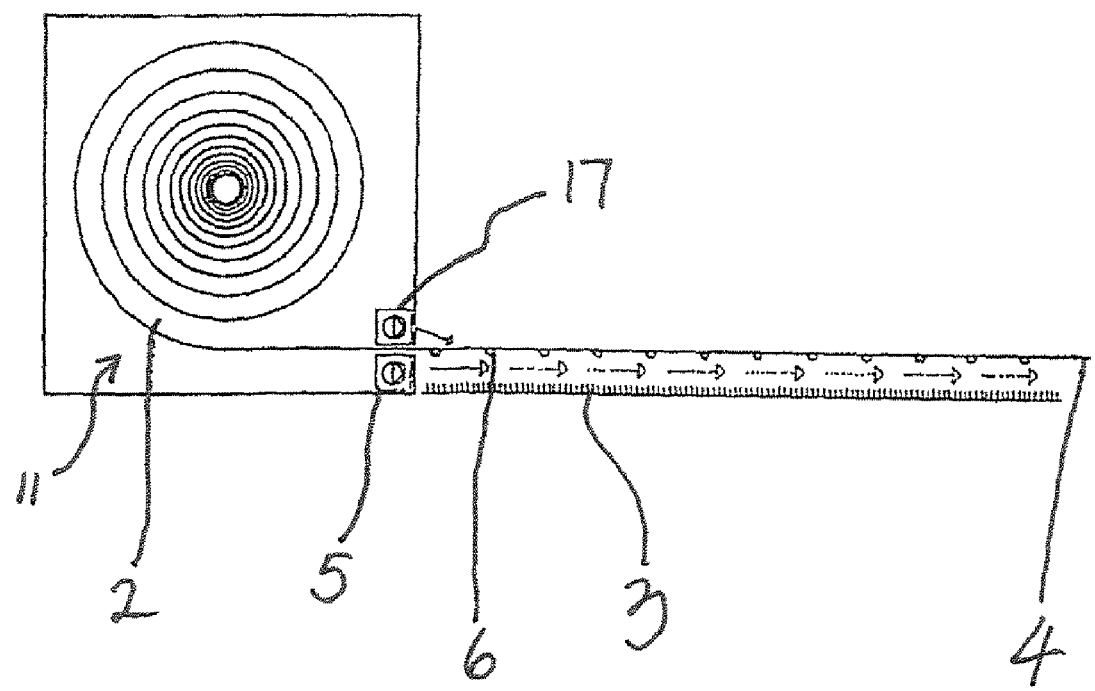

As seen in FIGS. 1a and 1b, the roll of tarp 2 may be stored in a chamber 11. The growth promoting system includes an air supply 17 for cleaning and drying the tarp. Alternatively, as seen in FIG. 2, the roll of tarp 2 may be stored in a culvert 9 having a room 27 for inspections and maintenance by an operator 26 and a room 28 for storage. As seen in FIG. 5, the culvert 9 may be located below a tribune 57 and a advertising sign 58 located near the exit of the culvert from which the tarp enters and exits the culvert 9.

As seen in FIG. 3, the growth promoting system may include an air supply valve in 31 and an air supply valve out 34.

FIG. 4 shows a football field 41 provided with an embodiment of the growth promoting system of the present application. The system includes a pulling boom 45, an air beam 49.

The invention claimed is:

1. A system for promoting growth of plants under suboptimal climate and lighting conditions, the system comprising a flexible tarp that is kept floating at a controllable distance above the plants by means of an over pressure under the tarp, the over pressure being produced by means of an over pressure system, the flexible tarp and the over pressure providing an enclosed space over the plants, wherein the flexible tarp comprises at least one light source providing lighting for the plants, wherein the at least one light source is integrated with the flexible tarp such that the at least one light source and the flexible tarp can be rolled and kept floating by the over pressure system, and one of: a fertilizing system, a watering system, or a fertilizing and watering system integrated with the tarp.

2. A system according to claim 1, wherein the tarp is wound up, folded or otherwise stored next to the plants to be treated when the tarp is not in use.

3. A system according to claim 1, wherein the at least one light source emits a wide bandwidth light, or a narrow bandwidth light with a spectral composition comprising 60-99% red light (600-630 nm) in combination with 1-20% blue light (400-450 nm).

4. A system according to claim 1, wherein the tarp is stiffened by means of fibers, ribs, or air beams.

5. A system according to claim 1, wherein the at least one light source comprises light emitting diodes arranged on the flexible tarp.

6. A system according to claim 1, wherein the tarp is stored in a culvert or on a vehicle.

7. A system according to claim 2, wherein the tarp is wound up or folded next to the plants when not in use.

8. A system according to claim 1, wherein the at least one light source emits a narrow bandwidth light having a spectral composition comprising 60-99% red light (600-630 nm) in combination with 1-20% blue light (400-450 nm) and 1-20% white light.

9. A system according to claim 4, wherein the means for stiffening the tarp comprises carbon fiber, fiberglass or other suitable materials.

10. A system according to claim 1, further comprising a fertilizing system, a watering system, or a fertilizing and watering system integrated with the over pressure system.

11. A system according to claim 1, wherein the flexible tarp further comprises a separate layer containing cables or electronics.

* * * * *